US011722306B2

United States Patent
Bahloul

(10) Patent No.: US 11,722,306 B2
(45) Date of Patent: *Aug. 8, 2023

(54) METHOD FOR STRONG AUTHENTICATION OF AN INDIVIDUAL

(71) Applicant: Idemia Identity & Security France, Courbevoie (FR)

(72) Inventor: Sébastien Bahloul, Courbevoie (FR)

(73) Assignee: Idemia identity & Security France, Courbevoie (FR)

( * ) Notice: Subject to any disclaimer, the term of this patent is extended or adjusted under 35 U.S.C. 154(b) by 382 days.

This patent is subject to a terminal disclaimer.

(21) Appl. No.: 16/877,803

(22) Filed: May 19, 2020

(65) Prior Publication Data

US 2020/0374124 A1 Nov. 26, 2020

(30) Foreign Application Priority Data

May 24, 2019 (FR) ..................................... 1905521

(51) Int. Cl.
*H04L 9/32* (2006.01)
*G06K 7/14* (2006.01)
(Continued)

(52) U.S. Cl.
CPC ............ *H04L 9/3231* (2013.01); *G06F 21/32* (2013.01); *G06K 7/1417* (2013.01);
(Continued)

(58) Field of Classification Search
CPC ... H04L 9/3231; H04L 9/3221; H04L 9/3234; H04L 63/0861; H04L 63/0892; G06F 21/35; G06F 21/32; G06K 7/1417
See application file for complete search history.

(56) References Cited

U.S. PATENT DOCUMENTS 9,519,824 B2 12/2016 Fondeur et al.
9,855,785 B1 * 1/2018 Nagelberg ....... G06K 19/06028
(Continued)

FOREIGN PATENT DOCUMENTS

EP  2656321 B1  1/2015
EP  3206192 A1  8/2017
WO  2018/233487 A1  12/2018

OTHER PUBLICATIONS

Yang, Dexin; Xu, Baolin; Yang, Bo; Wang, Jianping; "A Novel Biometric Authentication Scheme with Privacy Preserving," 2012 Eighth International Conference on Computational Intelligence and Security, Guangzhou, China, 2012, pp. 452-456, doi: 10.1109/CIS.2012.107.*

(Continued)

*Primary Examiner* — Victor Lesniewski
(74) *Attorney, Agent, or Firm* — Womble Bond Dickinson (US) LLP

(57) ABSTRACT

A method for strong authentication of an individual by a server and a connected client device, the client device having a candidate biometric data of the individual and an image from an identity document representing at least one photograph of the individual and one optical reader data visible on the identity document. A cryptographic footprint includes extracting, by analysis of the acquired image and the optical reader data, calculating a first data decoded by application of a decoding process to the candidate information and to a first encoded data, such that the first decoded data matches first random data if the candidate information matches a reference information representative of the appearance of the photograph, verifying that a cryptographic footprint of a first concatenation of the extracted optical reader data and the decoded data coincides with the first (Continued)

cryptographic footprint, and a reference biometric data and the candidate biometric data match.

16 Claims, 1 Drawing Sheet

(51) Int. Cl.
  *G06F 21/32* (2013.01)
  *H04L 9/40* (2022.01)
(52) U.S. Cl.
  CPC .......... *H04L 9/3221* (2013.01); *H04L 9/3234* (2013.01); *H04L 63/0861* (2013.01)

(56) References Cited

U.S. PATENT DOCUMENTS

| | | | |
|---|---|---|---|
| 10,403,076 B2 | 9/2019 | Chabanne et al. | |
| 2006/0235729 A1* | 10/2006 | Braithwaite | G06F 21/32 705/3 |
| 2012/0204035 A1* | 8/2012 | Camenisch | G06F 21/32 713/186 |
| 2013/0174243 A1* | 7/2013 | Inatomi | H04L 9/3231 726/7 |
| 2013/0279765 A1 | 10/2013 | Fondeur et al. | |
| 2014/0294258 A1* | 10/2014 | King | G07D 7/202 382/118 |
| 2015/0086088 A1* | 3/2015 | King | G06V 40/30 382/118 |
| 2015/0318994 A1* | 11/2015 | Walsh | G06F 21/32 713/182 |
| 2015/0341370 A1* | 11/2015 | Khan | H04L 63/20 726/30 |
| 2017/0048218 A1* | 2/2017 | Lindemann | H04L 63/0853 |
| 2017/0236355 A1 | 8/2017 | Chabanne et al. | |
| 2018/0108020 A1* | 4/2018 | Thatte | H04L 9/0866 |
| 2018/0191501 A1* | 7/2018 | Lindemann | H04L 9/0833 |
| 2018/0191695 A1* | 7/2018 | Lindemann | H04L 63/0853 |
| 2019/0327092 A1* | 10/2019 | Kareti | H04L 9/3231 |
| 2020/0092102 A1* | 3/2020 | Wang | H04W 12/06 |
| 2020/0260272 A1* | 8/2020 | Newman | H04W 12/06 |
| 2020/0280550 A1* | 9/2020 | Lindemann | H04L 63/0428 |

OTHER PUBLICATIONS

Drygajlo, Andrzej; "Multimodal Biometrics for Identity Documents and Smart Cards: European challenge," 2007 15th European Signal Processing Conference, Poznan, Poland, 2007, pp. 169-173.*

Wodo, Wojciech; Zientek, Sebastian; "Biometric linkage between identity document card and its holder based on real-time facial recognition," 2015 Science and Information Conference (SAI), London, UK, 2015, pp. 1380-1383, doi: 10.1109/SAI.2015.7237322.*

Yichun, S. et al., "DocFace+: ID Document to Selfie Matching," IEEE Transactions on Biometrics, Behavior, and Identity Science, dated Jan. 1, 2019, vol. 1, Issue 1, DOI: 10.1109/TBIOM.2019.2897807, pp. 56-67.

Sutcu, Y. et al., "Protecting Biometric Templates With Sketch: Theory and Practice," IEEE Transactions on Information Forensics and Security, Sep. 2007, vol. 2, Issue 3, DOI: 10.1109/TIFS.2007.902022, pp. 503-512.

Correspondence from the French National Institute of Industrial Property Office (INPI—Institute National De La Propriété Industrielle) for FR1905521 dated Mar. 13, 2020; Preliminary Research Report of the French National Institute of Industrial Property Office for FR1905521 dated Mar. 10, 2020; and Written Opinion on the Patentability of the Invention issued by the French National Institute of Industrial Property Office for FR1905521.

English machine translation of Correspondence from the French National Institute of Industrial Property Office (INPI—Institute National De La Propriété Industrielle) for FR1905521 dated Mar. 13, 2020; Preliminary Research Report of the French National Institute of Industrial Property Office for FR1905521 dated Mar. 10, 2020; and Written Opinion on the Patentability of the Invention issued by the French National Institute of Industrial Property Office for FR1905521.

* cited by examiner

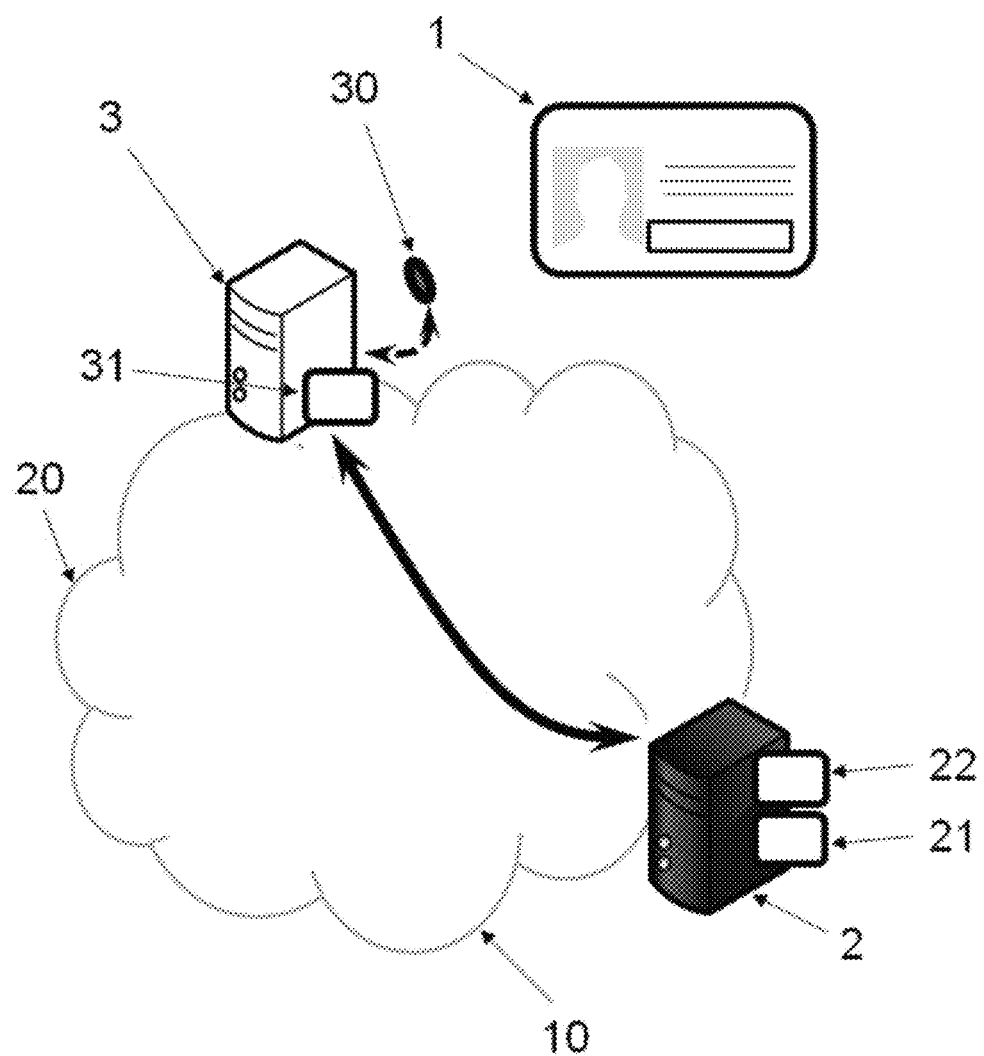

METHOD FOR STRONG AUTHENTICATION OF AN INDIVIDUAL

TECHNICAL FIELD OF THE INVENTION

The invention relates to a method for the strong authentication of an individual bearing an identity document.

STATE OF THE ART

Very robust strong authentication methods (i.e. more authentication factors) are known today, specifically as defined by the FIDO Alliance specifications.

E.g., an authenticator possessed by the user (typically his mobile device, a chip card, etc.) and anything that the user "knows" or "is" (a code, a biometric trait, etc.).

These methods are thoroughly satisfactory, but present a shortcoming in their "recovery" mechanisms implemented in the case of forgetting the code or of losing one's authenticator.

More specifically, either these recovery mechanisms use only a single authentication factor (typically, a link is sent to a recovery email address) resulting in the loss of all of the benefit of strong authentication, or it is necessary to save sensitive personal information like "response to a secret question" or an identifying photograph.

First, we note that a part of this solution is not reliable (if the requested information is too secret, the user may lose/forget it, and if it is too common, determined hackers may succeed in acquiring it by social engineering), and second, that holding such information poses problems in terms of respect for the privacy of the users.

Application EP2656321 proposes the use, as an authentication factor, of an image of any object chosen secretly by the individual, such as a jewel or an identity document. This method improves reliability, but still remains problematic in terms of privacy protection.

Thus, it would be desirable to provide a simple, reliable, secure solution that is thoroughly respectful of privacy, for the authentication of an individual, in particular for recovery purposes.

BRIEF DESCRIPTION OF THE INVENTION

According to a first aspect, the invention relates to a strong Authentication of an Individual implemented by a server and a connected client device;
the client device having a candidate biometric data for the individual and an image acquired from an identity document representing at least one photograph of said individual and an optical reader data visible on said identity document, and the server having a cryptographic footprint of a first concatenation of said optical reader data of said identity document and of a first random data, the so-called cryptographic footprint;
wherein the method is characterized in that it comprises the implementation by the data processing means of the server and/or of the client device of the steps of:
(b) Extraction, by analysis of said image acquired from said identity document, of:
a candidate information representative of the appearance of said photograph as depicted in the acquired image;
said optical reader data as depicted in the acquired image;
(c) Calculation of a first data decoded by application of a decoding process to said candidate information representative of the appearance of said photograph and to a first encoded data, such that said first decoded data matches the first random data if said candidate information representative of the appearance of said photograph matches a reference information representative of the appearance of said photograph;
(d) Verification that:
a cryptographic footprint of a first concatenation of the extracted optical reader data and of the decoded data matches said first cryptographic footprint in the server; and
a reference biometric data and the candidate biometric data of the individual match.

According to other advantageous and non limiting characteristics:

The method comprises a step (a) of prior acquisition of said image of said identity document representing at least one photograph of an individual and one optical reader data visible on said identity document by optical acquisition means of the client device, and the generation of the candidate biometric data using a biometric trait provided by the biometric acquisition means;

The biometric acquisition means are the optical acquisition means of the client device, wherein the client device is a personal electronic device of said individual, in particular like a mobile device or chip card:

The server or device has an encryption of the reference biometric data of said individual with a cryptographic footprint of a second concatenation of the optical reader data of the identity document and of the first random data, different from the first concatenation; wherein step (c) comprises the de-encryption of the at least one reference biometric data of said individual encrypted by means of the cryptographic footprint of a second concatenation of the extracted optical reader data and of the first decoded data;

The server has a cryptographic footprint constructed using a second random data, so-called third cryptographic footprint; step (c) comprises the calculation by means of the data processing of the server or of the client device of a second data decoded by application of a decoding process to said candidate biometric data and to a second encoded data, such that said second decoded data matches the second random data if said candidate biometric data matches the reference biometric data; said verification of step (d) that the reference biometric data and the candidate biometric data of the individual comprising the verification that a cryptographic footprint constructed using the second decoded data in the same way as the third cryptographic footprint is constructed using the second random data matches said third cryptographic footprint of the server.

Step (a) comprises the reception by the server of the acquired image of said identity document and of the candidate biometric data from the client device, wherein steps (b) and (c) are implemented by the data processing means of the server;

The method comprises steps (b) and (c) which are implemented by the data processing means of the client device, step (c) comprising the calculation of the cryptographic footprint from a first concatenation of the extracted optical reader data and from the first decoded data, and the generation of zero-knowledge proof of the calculation of said cryptographic footprint using the first concatenation of the extracted optical reader data and of the first decoded data; the verification of step (d) that the cryptographic footprint of a first concatenation of the extracted optical reader data and of the decoded data matches the first cryptographic footprint comprising the verification that:

the proof of non-disclosure of the knowledge of the calculation of said cryptographic footprint using the first concatenation of the extracted optical reader data and of the first decoded data is valid, and the first cryptographic data received matches said first cryptographic footprint in the server; Steps (b) and (c) are implemented by the data processing means of the client device, wherein step (c) comprises the generation of a zero-knowledge proof of the fact that the reference biometric data and the candidate biometric data of the individual match; said verification of step (d) that the reference biometric data and the candidate biometric data of the individual match comprising verification by the data processing means of the server that the zero-knowledge proof of the fact that the reference biometric data and the candidate biometric data of the individual match is valid.

The method also comprises a prior step (a0) of enrollment of data from said identity document which comprises the sub-steps of:

(A) Obtaining the photograph of said individual visible on said identity document and of the optical reader data of the identity document;

(B) Extracting by analysis of said photograph of the reference information representative of the appearance of said photograph;

(C) Generating the first random data encoded by application of an encoding process to said reference information representative of the appearance of said photograph and to said first random data, and of the first cryptographic footprint;

During step (a0), sub-step (A) or sub-step (B) comprises the obtaining of said reference biometric data; and sub-step (C) further comprises, the generation of the second random data and the calculation of the second encoded data by application of said encoding process to said reference biometric data and to said second random data, and of the third cryptographic footprint;

The decoding process is a complementary process from a sketching process from an algorithm like "secure sketch";

The optical reader data from the identity document is a data like MRZ, QR code or PDF417;

The method also comprises a step (e) of enrollment of an authenticator, in particular from the Fast Identity Online, FIDO, alliance.

The reference information representative of an expected appearance of said photograph is a Digital Photo Seal type security data.

According to a second aspect, the invention relates to a strong authentication assembly comprising a connected server and client device, characterized in that the client device and/or the server comprise data processing means configured to:

Extract, by analysis of an image acquired from an identity document representing at least on photograph of an individual and an optical reading data visible on said identity document:

a candidate information representative of the appearance of said photograph as depicted in the acquired image;

said optical reader data as depicted in the acquired image;

Calculate a first data decoded by application of a decoding process to said candidate information representative of the appearance of said photograph and to the first encoded data, such that said first decoded data matches a first random data if said candidate information representative of the appearance of said photograph matches a reference information representative of the appearance of said photograph, wherein the server has a cryptographic footprint of a first concatenation of said optical reader data of said identity document and said first random data, so called first cryptographic footprint;

verifying that:

a cryptographic footprint of a first concatenation of the extracted optical reader data and of the decoded data matches said first cryptographic footprint in the server; and a reference biometric data and the candidate biometric data of the individual match.

According to a third and a fourth aspect, the invention relates to a computer program product comprising code instructions for the execution of a method according to the first aspect of strong authentication of an individual, whereupon said process is executed on a computer; and a storage means readable by computer equipment whereupon a computer program product comprises code instructions for executing a method according to the first aspect of strong authentication of an individual.

DESCRIPTION OF THE FIGURES

Other characteristics, purposes and benefits of the present invention will be apparent upon reading the detailed description whereupon follows, in relation to the annexed FIGURES, given as non-limiting examples and whereupon:

FIG. 1 represents schematically a system for the implementation of the methods according to the invention.

DETAILED DESCRIPTION

Architecture

The present invention relates to a method for Strong Authentication of an Individual bearing an identity document, i.e. it allows verifying that this individual is indeed the one whose identity is disclosed by the document 1, including possibly a method for enrolling information from this identity document 1.

The present method is called strong authentication because it combines "something that the individual possesses", i.e. his identity document 1, and "something that the individual is/knows", in this case, a biometric trait. In fact, there are two possible levels of fraud:

The first is falsification of the identity document, for example, by changing the photograph, The second is identity theft, for example, the use of a valid identity document 1 by a theft as being his own.

The present method makes it possible to detect the two levels of fraud due to the strong nature of the authentication.

Advantageously, the present method is an "enrollment of an authentication factor" method, i.e. of addition or modification of a means for self-authentication (which may be chosen from among a password, a physical authentication device and, in particular, a "FIDO authenticator", and email address, etc.) which will then be used recurrently for everyday authentication. The preceding method is thus typically implemented upon first use of said authentication factor, and specifically in the case of loss of a preceding authentication factor (which is spoken of as a recovery process: which is the case wherein the user wishes to again be authenticated despite this loss).

By FIDO authenticator is meant a security device from the FIDO (Fast Identity Online) that specifically complies with an authentication standard such as U2F (Universal 2nd Factor), FIDO2, Client to Authenticator Protocol (CTAP), etc.; e.g. a mobile device (such as device 3, see below), a USB key, a chip card, each one storing a secret (a private key/public key pair). Thus, the present method is typically used in the case of loss of a FIDO authenticator, but it will be understood that it is thoroughly suitable for any type of identification factor, and could even be used at each authentication in order to access a service for which a maximum security level is required (e.g. in order to send a bank wire transfer, make a property purchase, etc.)

In a particularly preferred manner, said authenticator to be enrolled is client device 3, which enables a simple and transparent enrollment process, wherein device 3 provides in migration all of the necessary identification data such as, e.g., a MAC address, and is able to submit, at the end of this process, a secret (for example, a pair of keys) making it possible for them to thereafter act as authenticator of the individual.

Referring to FIG. 1, an authentication system architecture is represented herein for the implementation of the present method. This system comprises at least one identity document 1, a server 2 and a client device 3 connected to the server 2 by a network 20, such as the internet.

The identity document 1 is an object personal to an individual (many individuals may each have such an identity document) and preferentially constitutes an official document, advantageously issued by a governmental body. This document may take numerous forms such as an identity card or a passport, and may possibly be electronic. Alternatively, this may be any document chosen by the individual or by a service provider with evidential value for the authenticator, i. e., a document representative of the identity of the individual, which could be e.g., a travel pass, a professional card, a corporate identification badge, a license, or even a document custom made by an authenticators management body which would be necessary in order to enroll a new authenticator, by analogy, with documents provided with security locks which are required in order to make a pair of keys. According to one embodiment, it takes the form of a chip card (like a "smart card") of standard dimensions and generally made of PVC or polycarbonate.

In all cases, the identity document 1 comprises a hard surface whereupon a certain amount of information is printed and, in particular:
  A photograph of the individual who is the holder of the card (and possibly of another "graphic" data, such as the individual's signature);
  and optical reader data (i.e., automatically readable, intended for computers), like MRZ, QR code or PDF417 (we will use the example of the MRZ in the rest of the document, but it is understood that this is not imposing this type of optical reader data as a limit);
  Varied alpha-numeric data, called "visual data", chosen specifically from among:
    Full number of identity document 1;
    Expiration date;
    Issue date;
    Surname;
    Given name(s);
    Nationality;
    Date of Birth;
    Place of Birth;
    Sex;
    Height;
    Address;
    etc.

The server 2 is a secure, remote device, typically belonging to an authority or to a security solutions provider. It comprises data processing means 21 (like a processor) and data storage means 22 (a memory, e.g., or a hard disk).

The client device 3 is a local device comprising or connected to optical acquisition means 30 (typically a photo device or a scanner), and suitable for acquiring an image (of document 1, as we will see). In addition, it comprises data processing means 31 and data storage means 32. The client device 3 and the server 2 advantageously comprise communications interfaces making remote dialog possible. Preferentially, the client device 3 is a personal device of the individual bearing identity document 1, e.g., a mobile device of the individual (specifically, like a smart phone).

Preferentially, the client device 3 is capable of generating a biometric data using a biometric trait of the individual. The biometric trait may, e.g., be the shape of the face, a fingerprint, a palm print, an iris of the individual, etc. The extraction of the biometric data is implemented by processing the image of the biometric trait which is a function of the nature of the biometric trait. Various means for processing images in order to extract biometric data are known to the skilled person. As a non-limiting example, the extraction of the biometric data may comprise an extraction of specific points or of a shape of a face, in the case where the image is an image of the face of the individual.

The client device 3 comprises or is connected, in this context, to biometric acquisition means, typically an image sensor and, in a particularly preferential manner, these biometric acquisition means are the optical acquisition means 30, e.g., a photographic device suitable for acquiring a photograph of the face in "selfie" mode (we note that, alternatively, different acquisition means could be used, such as a fingerprint sensor).

In all cases, a reference biometric data used for authentication of the individual is advantageously a data pre-recorded in the presence of an authority (see below), or a data originating in identity document 1, such as a photograph.

We note that the device 3 may take many forms of embodiment. More specifically, and as we will see, it is sufficient for the embodiment of the invention that the client device 3 is able to obtain an image acquired from the identity document 1, one way or another, including indirectly, and to process this image.

In all cases, as explained, the client device 3 can acquire an image of an image of the identity document 1, i.e., photograph a photocopy rather than the document 1 directly, or photocopy a photocopy, etc. As will be seen, it will suffice that the acquired image represent the document 1. It will be understood that the present method is not limited to any way of obtaining this image, nor to any specific manner (the acquired image can be black and white, distorted, etc.).

We note that it is entirely possible for other entities to be connected to the server 2 and to the device 3, in particular, servers that implement services receiving the information produced by the device 3, i.e., services requiring the authentication of the individual, e.g., a bank server, a hotel server, etc. Specifically, we can imagine that such a server has a classic authentication solution (e.g., with a FIDO authenticator), and will initiate the present method (by contacting the device 3) whereupon the user wishes to enroll a new authentication factor. This service server can, e.g., implement an API dedicated to the interrogation of the server 2 for the implementation of the present method.

As we will see, the present method makes it possible for this service to not store any of the individual's personal information.

Digital Photo Seal

In the next part of the present disclosure, the skilled person can refer to applications FR1904375 and FR1904406 which describe the mechanisms that can be used independently or in combination in the context of the invention.

In a known manner, the present method uses information representative of an appearance of a photograph (or another graphic component of the document 1), i.e., a data descriptive of at least one fragment of this photograph as it appears, i.e., a "signature", which will enable comparisons.

By "reference" information is meant the information representative of the "theoretical| appearance of the photograph, i.e., as expected. In contrast, by "candidate" information is meant the information representative of the recorded appearance of the photograph, i.e., as depicted in an image acquired from the document 1. We understand that this recorded appearance is not generally thoroughly identical to the expected appearance, due to the fact of the defect conditions inherent to the acquisition of an image, and to the variability of shooting conditions (lighting, movement, distance, etc.).

Nonetheless, said information representative of the appearance is chosen in such a way that if two photographs have appearances that match (i.e., it is the same photograph even if the shooting conditions are not identical), then their representative information matches (i.e., shows a difference according to a given metric less than a threshold) also.

Thus, the reference information and the candidate information match if, and only if, the recorded appearance and the expected appearance of the photograph match, i.e., that it is, indeed, the same photograph, in other words, that the photograph printed on identity document 1 has not been fraudulently altered. This verification can be made for each other graphic feature, such as a signature.

As information representative of the appearance of the photograph, we will be able to use the "Digital Photo Seal" (DPS) which we will use as an example in the next section of the present application, i.e. The security data as disclosed in the applications cited in the introduction, or more specifically, application EP3206192, based on the position of unique points on the graphic feature, or any other "signature" of a graphic object such as a photograph.

The DPS of a photograph is a characteristic of that image with is not a biometric model, and can, e.g., comprise a histogram of oriented gradients (so we speak of a HOG descriptor feature). Alternatively, we may use a classification algorithm of classification of the type using a convolutional neural network, also known by the acronym CNN.

Enrollment

Upon launching the method, we assume that the client device 3 has at least one acquired image from said identity document 1 representing at least one photograph of an individual and one optical reader data visible on the said identity document 1 (wherein the personal data of the individual are readable), and one candidate biometric data.

The client device 3 or the server 2 further needs to have a first "encoded data" (noted as SSKD) obtained by application of an encoding process to the DPS information of the reference representative of the appearance of the photograph of said individual visible on the said identity document 1 and to a first random data (noted as RNGD). In practice, this first encoded data is generally stored (at least initially) by the server 2.

The server 2 only needs to have a cryptographic footprint of a first concatenation of the optical reader data of the identity document 1 and the first random data RNGD.

Possibly, the client device 3 or the server 2 may have an encryption with a cryptographic footprint of a second concatenation of the optical reader data of the identity document 1 and of the first random data RNGD, different from the first concatenation, of the reference biometric data of said individual, and possibly other personal data (again, the encryption is often stored by the server 2).

We understand that none of these data can be used per se (in particular, if they are all stored on the server 2) because:
- Said first encoded SSKD data will not make it possible alone either to retrieve the reference DPS information or the first random RNGD data;
- The cryptographic footprint of a first concatenation of the optical reader data of the identity document 1 and of the first random RNGD data is a simple footprint carrying no information;
- The possible encryption of the biometric data is not readable by a person without the key.

In a preferred embodiment, the method comprises a prior step (a0) "of enrollment" making it possible to integrate and individual and his identity document 1 and to generate the data which the server 2 and/or the client device 3 must have. herein, it is necessary to make the distinction with an enrollment of an authentication factor which may be the result of the present method.

This step (a0) may be implemented a long time before the rest of the method, and does not need to be repeated at each instance of the method (it should be noted that we may specify repeating it from time to time for security purposed or for updating the personal information, but that remains optional). Thus, we may consider that the reference data above are predefined for the implementation of the method.

This enrollment process of the data from the identity document 1 of the individual may be executed by the server 2 or by the server of a governmental authority, and then the data obtained are transmitted to the server 2 and/or to the client device 3.

The enrollment begins with a step (A) of obtaining a photograph of said individual visible on the said identity document 1, of an optical reader data of the identity document 1, and, if applicable, from the biometric reference data of said individual.

This step (A) may itself be implemented by means of an image of the said identity document 1 (as will be explained for the authentication process), but, in a preferential manner, in order to avoid the problems of digitization and loss of quality, these data (i.e., the photograph, the optical reader data and/or the reference biometric data) are handled directly, in particular if the enrollment is done by a governmental authority. This, furthermore, makes it possible to update the data, see below.

In step (B), as explained, the extraction by analysis of the reference information (noted as DPS for convenience, even though as explained, the present method is not limited to Digital Photo Seal) representative of the appearance of said photograph is implemented by a known algorithm.

Then, in a step (C), the first random RNGD data is generated, so as to calculate the first encoded data (noted as SSKD for SSK-DATA for convenience, although, as explained, the present method is not limited to secure sketch) by application of an encoding process to said reference DPS information representative of the appearance of said photograph and to said first random RNGD data, i.e., SSKD=enc(DPS, RNGD).

The first random RNGD data is, as its name indicates, a data of random value providing randomness, which is important because its knowledge will make it possible to prove that we really do have the identity document 1.

Preferably, the decoding process is a sketching process an algorithm like "secure sketch"; This sketching process is known to the skilled person. It was specifically disclosed in the document "Fuzzy Extractors: How to Generate Strong Keys from Biometrics and Other Noisy Data", by Dodis et al. (See definition 3, given on page 11 of this document).

Other encoding processes can, however, be used by the processing unit 4 instead and in place of a sketching process (e.g., algorithm process like "fuzzy extractor" and, generally, fuzzy logic.

It should be noted that the encoding process can be applied directly to said reference information representative of the appearance of said photograph, but also indirectly, i.e., to data derived from this reference information in order to add entropy. For example, we can use, as derived data, a combination of reference information with the optical reader data, specifically a certain number of first bits of its cryptographic footprint (see below). In particular, this combination can be an "exclusive or", i.e. XOR(DPS;HMRZ), wherein HMRZ is the n first bits of the cryptographic footprint of the optical reader data (in the example where this is the MRZ) where n is the number of bits of reference information (the same number of bits is necessary for the XOR).

In all cases, the encoding process makes it possible to "mask" the first random RNGD data by the result of the DPS processing of the photograph, but in a retrievable way, by means of an decoding process complementary to the encoding process.

When the encoding process used for the enrollment is a sketching process of an algorithm like "secure sketch", the decoding process is the recovery process of the same algorithm like "secure sketch". Such a recovery process is also known to the skilled person (see definition 3 given on page 11 of the document "Fuzzy Extractors: How to Generate . . . » cited above).

More specifically, if we note as DpsRef the reference information and as DpsCand a candidate information (with SSKD=enc(RNGD, DpsRef)), then the encoding and decoding processes are such that if DpsCand is sufficiently close to DpsRef (i.e., different by less than a threshold, which is normally the case if we extract the representative information from the same photograph as that which was used to generate the reference information, even if we note that it remains impossible for the two values to match, we will always have |DpsCand-DpsRef|>0) while the first decoded data is equal to the first random RNGD data.

If, on the contrary, DpsCand is not sufficiently close to DpsRef, then the first decoded data is not the right value for the first random data.

Mathematically, the decoding process gives, for the first encoded SSKD data and for a DpsRef candidate information value, "the value x=dec(SSKD, DpeCand) such that a value ε exists for the standard less than a given threshold verifying SSKD=enc(x,DpsCand+ε), wherein x is equal to the value of the first random RNGD value, if we do indeed have DpdCand+ε=DpsRef.

It will be recalled that such encoding and decoding processes are known to the skilled person, and can be embodied in numerous ways. Furthermore, it will also be possible to increase the entropy of the encoded data by applying the encoding process to more data than just the information representative of the appearance of said photograph and said first random data.

Finally, in a step (D), the following are stored on the means of data storage 22 of the server 2 and/or the means of data storage 32 of the client device 3 (if applicable after transmission):

Said first encoded SSKD data;

The cryptographic footprint of a first concatenation of the optical reader data of the identity document 1 and of the first random RNGD data;

The potential encryption with the cryptographic footprint of a second concatenation of the optical reader data, of the identity document 1 and of the first random RNGD data, different from the first concatenation, by at least on reference biometric data of said individual.

These data, in the case where they are stored on the server 2, can be indexed in the memory 22 with a cryptographic footprint of an identifier of the identity document 1, generally obtained from the MRZ.

By cryptographic footprint, or hash, we mean the result of a predetermined cryptographic hash function.

Preferentially, the first and second concatenations match concatenations in two different directions, for example MRZ|RNGD for the first concatenation and RNGD|MRZ for the second concatenation, but we can use any other construction such as two concatenations in the same order, but including a predetermined character in the middle, e.g., MRZ|1|RNGD and MRZ|2|RNGD.

It is understood that the optical reader data of the identity document 1 and the first random RNGD data can be considered as bit patterns. The number of bits in the concatenation is thus the sum of the respective numbers of bits of the optical reader data of the identity document 1 and of the first random RNGD data.

For convenience, we note as first footprint said cryptographic footprint of the first concatenation (h(MRZ|RNGD) in particular), and as the second footprint, the cryptographic footprint of the second concatenation (h(RNGD|MRZ) in particular).

The ingenuity of these multiple concatenations makes possible the formation of more thoroughly independent footprints using the same data. In fact, knowing the first footprint (which is stored on the memory 22, and which therefore could be obtained by a hacker), it is not possible to obtain the second footprint. It remains necessary, in order to obtain it, to have the value of the first random RNGD data, which can only be retrieved by having the reference information.

Thus, the reference biometric footprint encrypted with the second cryptographic footprint (i.e., the second footprint is used as a key) remains accessible only to the holder of the identity document 1, such that the server 2 cannot manipulate or know the personal data of the user, which can be stored in complete security.

The first footprint can be associated in the server 2 with a descriptor of the status of the identity document 1, e.g. "OK", "Expired" or "KO".

It should be noted that the enrollment process can be repeated at regular intervals in order to update the personal data. Recent and reliable data will be able to be recovered from a governmental entity. In addition, an identity document 1 has only a limited life span, and must be regularly renewed.

According to a preferred embodiment, the client device 3 or the server 2 advantageously has (in the place of the encryption of the reference biometric data) of a second encoded data (noted as SSKT for SSK-TEMPLATE) obtained by application of an encoding process (typically, the same encoding process as that for a first encoded data)

to the reference biometric data and to the second random RNGD data (noted as RNGT); and the server 2 also has a cryptographic data constructed using the second random RNGT data. Again, all of these data can be stored (at least, initially) on the data storage means 22 of the server 2 (and associated with other data).

Said cryptographic footprint constructed using the second random RNGT data, so-called third cryptographic footprint, can be a cryptographic footprint directly from the second random RNGT data, or from any function (e.g., a concatenation) of the second random RNGT data and of another data, advantageously of the first cryptographic footprint (the cryptographic footprint of a first concatenation of the optical reader data of the identity document 1 and of the first random RNGD data).

We understand that none of these data is, again, usable per se, because:

Said first encoded SSKD data will not make it possible, alone, either to retrieve the reference biometric data or the first random RNGT data;

The cryptographic footprint constructed using the second random RNGT data is a simple footprint and does not contribute any information.

In such an embodiment, the enrollment step (a0) can further comprise:

At step (A) or at step (B), the obtaining of said biometric reference data (noted as TempRef for template of reference), for example from a photograph of the identity document 1;

At step (C), the generation of the second random RNGT data so as to calculate the second encoded SSKT data by application of said encoding process, i.e. SSKT=enc(TempRef, RNGT);

At step (D), storage on the data storage means 22 of the server 2 and/or the data storage means 32 of the client device 3 (if applicable, after transmission) of said second encoded SSKT data and of the cryptographic footprint constructed using the second random RNGT data.

It should be noted that these supplementary actions linked to the biometric enrollment can be implemented again in steps (A') to (D'), i.e., not necessarily simultaneously with the actions linked to the enrollment of the identity document 1.

Furthermore, it remains possible to implement a process of strong authentication of the individual without needing either encryption of the reference biometric data or of the second random RNGT data and of the second encoded SSKT data, specifically by storing it directly on the client device 3 (plain text), namely on a server dedicated to biometry like WebBIO, see below.

Authentication

At present, we assume that the enrollment was successfully executed, and that the identity document is at present usable.

In a preferred embodiment, the authentication process begins with a step (a) of acquisition, one way or another (e.g., by the acquisition means 30 of the client device 3) of an image of the identity document 1, the image representing at least the photograph of the individual and of the optical reader data of the identity document 1 (the MRZ) visible on said identity document 1. Preferentially, said image represents all of the identity document 1, at least all of one side. As explained, it can be necessary to acquire more images, e.g., in order to see all sides.

Typically, it is the individual who takes a photo of his identity document 1 with his mobile device, if need be upon request issued by the server desiring strong authentication (e.g., for the service from which he launched a recovery process, specifically via a dedicated API).

Referring to the "fresh" candidate biometric data, this can be obtained during the prior step (a). More specifically, once the image of the identity document 1 is acquired, the server 2 (or, again, the third party server) can then reclaim the acquisition of the candidate biometric data.

It is important to understand that if the enrollment step (a0) can be implemented weeks before the authentication, step (a) is, at worst, implemented several minutes before the reset of the process, in order to guarantee the "freshness" of the candidate biometric data.

Thus, step (a) advantageously comprises the generation of the candidate biometric data using a biometric trait provided by the biometric acquisition means of the client device 3 (i.e., typically the optical acquisition means 30). This means for example that the individual first takes a photograph of his identity document 1, then a picture of his face.

In order to guarantee the freshness of the candidate data, step (a) may comprise time stamping of the candidate biometric data by means of a time stamp.

The skilled person will know how to implement such time stamping by using known techniques, and advantageously, we use as a time marker a number used once (i.e., an arbitrary number, i.e. random, used a single time).

The purpose of the rest of the process is to verify that step (a) has been correctly executed as disclosed above, and that we do not have a fake (e.g., an image that has been fraudulently modified) or an identity theft (an individual who is not the bearer of the identity document 1).

In a step (b), the data processing means 21, 31 of the client device 3 or of the server 2, analyze the image in order to extract:

a candidate (DPS) information representative of the appearance of the photograph as depicted in the acquired image;

the optical reader data of the identity document 1.

The extraction of the candidate information comprises the identification of the photograph that appears in the image, and the obtaining of the candidate information in the same way as the reference information was obtained during enrollment. The identification of the photograph can be done using models and masks (in fact, identity documents always have the same organization), and thus, the analysis of the image can comprise the recognition of a contour of the identity document 1, the reframing of this contour, and the application of predetermined masks. In order to do this, adapted convolutional neural networks will be able to be used astutely. Similarly, regarding the optical reader data, algorithms exist making its automatic extraction possible, especially since zones like MRZ are specially specified in order to be easily read by a computer.

Once the photograph has been "isolated" on the image, we apply the same algorithms as those that were applied to the original photograph in order to obtain candidate information representative of the appearance of the photograph as depicted.

It is understood that the reference and candidate information must be obtained identically so that they can be compared.

According to a first embodiment, step (b) is implemented by the server 2, in accordance with the description in application FR1904375. The latter is assumed to store the first encoded data, and step (a) comprises, in this context, the transmission to the server 2 of said image acquired from the identity document 1. According to a second embodiment, step (b) is implemented directly by the client device 3 in accordance with the description in application FR1904406.

Preferentially, in this second embodiment, step (b) comprises the interrogation of the server 2 so as to recover at least said first encoded SSKD data if it is stored on this server 2, for example, by providing it with the cryptographic footprint of the document 1 (wherein this identifier is obtained from the MRZ, e.g.): the server 2 transmits the first encoded data associated with the received footprint. We note that, alternatively, said first encoded data can have been provided long earlier and stored since that time on the data storage means 32 of the client device 3.

In all cases, in a step (c), the data processing means 21, 31 of the server 2 or of the client device 3 calculate a first decoded data by application of a decoding process to said candidate information (DPS) representative of the appearance of said photograph and to said first encoded data.

As explained, the decoding process (and the encoding process) is such that said first decoded data corresponds to the first random RNGD data if said candidate information representative of the appearance of said photograph matches the reference information representative of the appearance of said photograph. In other words, if the reference information and the candidate information are sufficiently close, the decoded value will match the random RNGD value used to obtain this first encoded SSKD value.

In general, the result of a comparison of the candidate information and of the reference information must show that they are identical, or at least have a difference that is less than a predetermined threshold. For example, for graphic features like photographs, security data like Digital Photo Seal match if they differ by less than 10%.

Thus, it is understood that the value of the first random data "masked" by the DPS can be recovered if the user has a photograph identical to that used at the time of enrollment from which the reference information is taken.

In a step (d), the data processing means 21, 31 verify that a cryptographic footprint of a first concatenation of the extracted optical reader data and of the decoded data match with the cryptographic footprint of the first concatenation of the optical reader data of the identity document 1 and of the random data stored on the data storage means 22 of the server 2.

In other words, the server 2 or the client device 3 attempts to reconstitute the first footprint by executing the same concatenation of the extracted optical reader data and of the first decoded data.

If:
the extracted optical reader data matches the optical reader data used during enrollment; and
the first decoded data matches the first random RNGD data;
Then the first concatenation will give exactly the same result and we will again have the first footprint.

In all other cases, the entropy of the cryptographic hash functions leads to a very different result. If the document 1 has been altered (for example, by replacing the photograph), then the matching candidate and reference information will not match, therefore a false value is obtained for the random one and therefore for the first footprint, and the authentication will be rejected.

It should be noted that if it is the client device 3 that has up until that time implemented the disclosed steps, it is necessary to inform the server 2 of the result of the verification.

However, the correct value of the first footprint can be known, wouldn't this be from a preceding authentication of the individual. This is why the client device 3 will advantageously prove that it obtained this first footprint correctly, i.e., non-interactively, i.e., with only one "going" of the information of the client device 3 to the server 2, and without a "return". And, especially as explained, the server 2 will not receive either the first random RNGD data or the candidate information representative of the appearance of said photograph, nor the optical reader data (nor any data making it possible to go back to these latter), even though it may perhaps be possible for the server 2 to know with certainty that the first footprint was correctly calculated. In addition, all of the transmitted data are not sensitive, and could be intercepted without this posing a problem.

In order to do this, in step (d) the data processing means 31 of the client device 3 acting as an entity of proof, generate, advantageously, zero-knowledge proof of the calculation of said cryptographic footprint using the first concatenation of the extracted optical reader data and the first decoded data, i.e., that the first cryptographic footprint was effectively calculated, and correctly, wherein said proof is transmitted by the client device 3 to the server 2, said zero-knowledge proof with the calculated cryptographic footprint.

More specifically, said zero-knowledge proof guarantees the following information: "given a cryptographic footprint H, there exists an optical reader data and a first random RNGD data (the decoded data) such that their first concatenation has for footprint this given cryptographic footprint H." The skilled person can consult document FR1904406 for more information.

Thus, the data processing means 21 of the server 2 must only verify that the zero-knowledge proof is valid, and that the cryptographic footprint received matches that of the first concatenation of an optical reader data from the said identity document 1 and from a first random data that the server 2 has.

If the proof is not valid, then the first cryptographic footprint was not validly obtained, and therefore, potentially, the individual does not have the identity document and is attempting identity theft. If the proof is valid, but the cryptographic footprint received does not match the one held by verification entity 2, then the first decoded data does not match the first random one or the extracted reader data is not the original, i.e., then the identity document 1 was falsified (at the level of the photograph or of the optical reader data). A warning for fraudulent use can be issued.

In step (d), the data processing means 21, 31 also verify that the reference biometric data and the candidate biometric data of the individual match, with the process therefore involving a comparison between the candidate biometric data and the reference biometric data. It should be noted that a control of the biometric process can be involved, so as to verify e.g., that the reference biometric data is not the result of a ruse (e.g., a face mask or a resin finger).

This step can be implemented in numerous known ways, by using the client device 3, the server 2, or a dedicated biometric server.

We note that all combinations are possible: each of the client device 3 and of the server 2 can implement 0, 1 or 2 verifications of step (d).

It is, for example, entirely possible that the server 2 receives, in step (a), both the image acquired from the identity document 1 and the candidate biometric data. In an especially preferred manner, we can even imagine that during step (a), the server 2 first receives the image acquired from the identity document 1, then requests of the device 1 the candidate biometric data that is then transmitted to it a second time.

Alternatively, or in addition, the server 2 or the device 3 can transmit (if applicable, retransmit) the candidate biometric data to a trusted server dedicated to biometry, storing the reference biometric data, which implements the comparison and sends the result to the server.

In all cases, the implementation of the comparison typically comprises the calculation of any distance between the data, the definition of which varies based on the biometric data in question. Calculation of the distance comprises the calculation of a polynomial between the components of the biometric data, and advantageously, the calculation of a scalar product.

For example, in the case where the biometric data were obtained using images of the iris, a distance classically used for comparing two data is the Hamming distance. In the case where the biometric data were obtained using images of the face of the individual, it is common to use the Euclidean distance. This type of distance calculation is known to the Skilled person and will not be disclosed in further detail.

In the case where the server 2 or the client device 3 stores an encryption of the reference biometric data of said individual with a cryptographic footprint of a second concatenation of the optical reader data of the identity document 1 and of the random data (the second cryptographic footprint), step (d) comprises the de-encryption of this reference biometric data, by means of the cryptographic footprint of a second concatenation of the extracted optical reader data and of the decoded data (each obtained in step (d)), in order to be able to make the comparison. Again, the skilled person can refer to application FR1904375.

In the case where a second encoded SSKT data obtained by application of an encoding process to a reference biometric data and to a second random RNGT data and a cryptographic footprint constructed using the second random RNGT data, a decoding process can be used to verify if the candidate biometric data and the reference biometric data match, in the same way as was done for the information like DPS on the photograph.

Again, whereupon the encoding process used for the enrollment is a sketching process of an algorithm like "secure sketch", the decoding process is the recovery process of the same algorithm like "secure sketch", and the skilled person can use other processes.

Mathematically, the decoding process gives, for the second encoded SSKD data and for a TempCand candidate, "the value x=dec(SSKT, TempCand) such that a value ε exists for the standard less than a given threshold verifying SSKD=enc(x,TempCand+ε), wherein x is equal to the value of the first random RNGT value, if we do indeed have TempCand+ε=TempRef.

Thus, step (c) also advantageously comprises the calculation by data processing means 21, 31 of the server 2 or of the client device 3.
- a second data decoded by application of a decoding process to said candidate biometric data and to the second encoded data (again, the encoded data is such that the second decoded data matches the second random RNGT data if said candidate biometric data matches the reference biometric data);
- a cryptographic footprint constructed using the second decoded data (it is understood that this cryptographic footprint must be constructed in the same way as the third cryptographic footprint using the second random RNGT data, specifically the cryptographic footprint of a concatenation of the second random RNGT data and of the first cryptographic footprint).

In all cases, the comparison of the biometric data can by done by the data processing means 21 of the server 2, but it is preferable that it be done on the client device 3 in order to thoroughly guarantee the privacy of the individual.

In order to do this, a new cryptographic protocol can be used wherein a "proof" that the candidate biometric data and the reference biometric data match is generated, wherein this proof reveals nothing other than the fact that these biometric data are indeed by the producer of the proof.

In other words, we can use up to two proofs of non-disclosure of knowledge:
- the first proof is the proof of the calculation of said cryptographic footprint using the first concatenation of the extracted optical reader data and of the first decoded data is valid;
- the second proof is a proof of the fact that the candidate biometric data and the reference biometric data match.

In this case, step (d) advantageously comprises the generation by the data processing means 31 of the client device 3 of the zero-knowledge proof of the fact that the candidate biometric data and the reference biometric data match, which is, in particular, a proof of the calculation of said cryptographic footprint using the second decoded data, (i.e., the second random RNGT data) are indeed in the possession of the producer of the proof. Again, the proof is intended to guarantee that the third cryptographic footprint was effectively and correctly calculated.

More specifically, said zero-knowledge proof guarantees the following information: "given a cryptographic footprint T, there exists a second random RNGT data (and, if applicable, an optical reader data) such that a given function of this second random RNGT data has as its footprint this given cryptographic footprint." In the specific case where the third footprint is the cryptographic footprint of a concatenation of the second random RNGT data and of the first cryptographic footprint, the guarantee affirmation is the following: "given a cryptographic footprint T, there exists a second random RNGT data and another cryptographic data H such that a concatenation of this second random RNGT data and of this other cryptographic footprint H has for footprint said given cryptographic footprint T."

The second zero-knowledge proof can be generated in the same way as the first proof of non-disclosure of knowledge, and transmitted to the server 2 with the new calculated cryptographic footprint (the third footprint), see again document FR 1904406.

If all verifications are made successfully, the server 2 approves the authentication of the individual and typically transmits a "token" to the server which requested the authentication/recovery of the individual. More specifically, if the process is an enrollment process for an authenticator, in particular FIDO, this enrollment is then executed. In other words, the method advantageously comprises a step for enrolling an authenticator. If this authenticator to be enrolled is going directly to the device 3, it can submit a secret or even submit the public key matching one of a pair of keys for which it holds the private key making it possible to be used as an authenticator of the individual. Alternatively, it could receive such a secret.

It will be noted that instead of simultaneously implementing the verification of the document 1 and the biometric verification (i.e., using the same steps (a) to (d)), it is entirely possible to implement the methods one after the other, i.e., that there will be steps (a') to (d') for the process implemented in second (in particular, the biometric verification, even if the reverse order is possible).

It is understood that this process limits, to the greatest degree possible, the need for personal information and the associated potential leaks, while guaranteeing the maximum level of security.

Server

According to a second aspect, the assembly of the connected server 2 and of the client device 3 is proposed for the implementation of the process according to the first aspect, i.e., of authentication of the individual bearing an identity document.

As explained, the client device 3 and/or the server 2 comprising data processing means 21, 31 (according to the case where there is direct processing of the data by the server 2, or if it is the device 3 that does this processing and transmits to the server 2 a zero-knowledge proof of their proper execution), configured in order to:

Extract, by analysis of an image acquired from the identity document 1 representing at least one photograph of an individual and an optical reading data visible on said identity document 1:
  a candidate information representative of the appearance of said photograph as depicted in the acquired image;
  said optical reader data as depicted in the acquired image;

Calculate a first data decoded by application of a decoding process to said candidate information representative of the appearance of said photograph and to the first encoded data, such that said first decoded data matches a first random data if said candidate information representative of the appearance of said photograph matches a reference information representative of the appearance of said photograph, wherein the server has a cryptographic footprint of a first concatenation of said optical reader data of said identity document 1 and said first random data, so called first cryptographic footprint;

verify that:
a cryptographic footprint of a first concatenation of the extracted optical reader data and of the decoded data matches said first cryptographic footprint in the server 2; and
a reference biometric data and the candidate biometric data of the individual match.

The client device 3 can also comprise (or be connected) optical acquisition means 30 and/or biometric acquisition means, in particular, optical acquisition means 30, for the acquisition of the candidate biometric data.

Computer Program Product

According to a third and a fourth aspects, the invention relates to a computer program product comprising code instructions for execution (in particular on data processing means 21 of the server 2 and data processing means 31 of the client device 3) of a method according to the first aspect of the invention (a memory 22 of the server 2 and a memory 32 of the client device 3) whereupon said computer program product is located.

The invention claimed is:

1. A method for strong authentication of an individual comprising:
    (a) acquisition of a candidate biometric data for the individual and an image acquired from an identity document representing at least one photograph of the individual and one optical reader data visible on the identity document;
    (b) by analysis of the image acquired from the identity document, extracting:
        a candidate information representative of the appearance of the photograph as depicted in the acquired image; and
        the optical reader data as depicted in the acquired image;
    (c) calculating a first decoded data by application of a decoding process to the candidate information representative of the appearance of the photograph and to a first encoded data, wherein the first decoded data matches a first random data if the candidate information representative of the appearance of the photograph matches a reference information representative of the appearance of the photograph; and
    (d) after the calculation of the first decoded data, verifying a first condition if a coincidence exists between:
        a first candidate cryptographic footprint, wherein the first candidate cryptographic footprint is a cryptographic footprint of a first concatenation of the extracted optical reader data and of the first decoded data; and
        a first reference cryptographic footprint, wherein the first reference cryptographic footprint is a cryptographic footprint of a first concatenation of the optical reader data of the identity document and of the first random data,
        and a second condition if a reference biometric data matches the candidate biometric data of the individual; and
    (e) if the first condition and the second condition are verified, performing an enrollment of an authenticator.

2. The method according to claim 1, comprising a step (a) of prior acquisition of the image of the identify document representing at least one photograph of an individual and one optical reader data visible on the identity document by optical acquisition means of the client device, and the generation of the candidate biometric data using a biometric trait provided by the biometric acquisition means.

3. The method according to claim 2, wherein the biometric acquisition means are the optical acquisition means of the client device, wherein the client device is a personal electronic device of the individual, in particular of mobile device or chip card type.

4. The method according to claim 1, wherein the server or the device has an encryption of the reference biometric data of the individual with a second reference cryptographic footprint of a second concatenation of the optical reader data of the identity document and of the first random data, different from the first concatenation; wherein step (c) comprises the de-encryption of the at least one reference biometric data of the individual encrypted by means of the second reference cryptographic footprint of a second concatenation of the extracted optical reader data and of the first decoded data.

5. The method according to claim 1 wherein the server has a cryptographic footprint constructed using a second random data, so-called third reference cryptographic footprint; step (c) comprising the calculation by means of the data processing means of the server or of the client device of a second data decoded by application of a decoding process to the candidate biometric data and to a second encoded data, such that said second decoded data matches the second random data if the candidate biometric data coincides with the reference biometric data; said verification of step (d) that the reference biometric data and the candidate biometric data of the individual coincide comprising the verification that a second candidate cryptographic footprint constructed using the second decoded data in the same way as the third reference cryptographic footprint is constructed using the second random data coincides with the third reference cryptographic footprint in the possession of the server.

6. The method according to claim 1, wherein step (a) comprises the reception by the server of the acquired image of the identity document and of the candidate biometric data from the client device, wherein steps (b) to (d) are implemented by the data processing means of the server.

7. The method according to claim 1 wherein steps (b) and (c) are implemented by the data processing means of the client device, step (c) comprising the calculation of the first candidate cryptographic footprint from a first concatenation of the extracted optical reader data and from the first decoded data, and the generation of zero-knowledge proof of the calculation of the first candidate cryptographic footprint using the first concatenation of the extracted optical reader data and of the first decoded data; the verification of step (d) that the first candidate cryptographic footprint of a first concatenation of the extracted optical reader data and of the decoded data matches the first reference cryptographic footprint comprising the verification that:
the proof of non-disclosure of the knowledge of the calculation of the candidate cryptographic footprint using the first concatenation of the extracted optical reader data and of the first decoded data is valid, and
the first received candidate cryptographic footprint matches the reference' first cryptographic footprint in the possession of the server.

8. The method according to claim 1 wherein steps (b) and (c) are implemented by the data processing means of the client device, wherein step (c) comprises the generation of a zero-knowledge proof of the fact that the reference biometric data and the candidate biometric data of the individual match; the verification of step (d) that the reference biometric data and the candidate biometric data of the individual match comprising the verification by the data processing means of the server that the zero-knowledge proof of the fact that the reference biometric data and the candidate biometric data of the individual match is valid.

9. The method according to claim 1 comprising a prior step (a0) of enrollment of data from the identity document comprising sub-steps of:
(A) Obtaining the photograph of the individual visible on the identity document and of the optical reader data of the identity document;
(B) Extracting by analysis of the photograph the reference information representative of the appearance of the photograph;
(C) Generating the first random data; calculating the first encoded data by application of an encoding process to the reference information representative of the appearance of the photograph and to the first random data, and of the first reference cryptographic footprint.

10. The method according claim 9, wherein the server has a cryptographic footprint constructed using a second random data, so-called third reference cryptographic footprint;
step (c) comprising the calculation by means of the data processing means of the server or of the client device of a second data decoded by application of a decoding process to the candidate biometric data and to a second encoded data, such that the second decoded data matches the second random data if the candidate biometric data coincides with the reference biometric data;
said verification of step (d) that the reference biometric data and the candidate biometric data of the individual coincide comprising the verification that a second candidate cryptographic footprint constructed using the second decoded data in the same way as the third reference cryptographic footprint is constructed using the second random data coincides with the third reference cryptographic footprint in the possession of the server; and
where during step (a0), the sub-step (A) or sub-step (B) comprises the obtaining of the reference biometric data; and sub-step (C) further comprises the generation of the second random data and the calculation of the second encoded data by application of the encoding process to the reference biometric data and to the second random data, and of the third cryptographic footprint.

11. The method according to claim 1 wherein the decoding process is a complementary process from a sketching process of an algorithm of "secure sketch" type.

12. The method according to claim 1 wherein the optical reader data from the identity document is a MRZ, QR code or PDF417 data.

13. The method according to claim 1, wherein the enrollment of the authenticator comprises an enrollment of a Fast Identity Online, FIDO, alliance authenticator.

14. The method according to claim 1 wherein he reference information representative of an expected appearance of the photograph is a security data of Digital Photo Seal type.

15. A strong authentication assembly comprising a connected server and client device, the authentication assembly comprises data processing means configured to:
generate a random data and a first reference cryptographic footprint, wherein the first reference cryptographic footprint is a cryptographic footprint of a first concatenation of the optical reader data of the identity document and of the random data;
acquire a candidate biometric data for the individual and an image acquired from an identity document representing at least one photograph of the individual and one optical reader data visible on the identity document;
extract, by analysis of an image acquired from the identity document representing at least one photograph of an individual and an optical reading data visible on the identity document:
a candidate information representative of the appearance of the photograph as depicted in the acquired image;
the optical reader data as depicted in the acquired image;
calculate a first decoded data by application of a decoding process to the candidate information representative of the appearance of the photograph and to a first encoded data, such that the first decoded data matches a first random data if the candidate information representative of the appearance of the photograph matches a reference information representative of the appearance of the photograph;
verify a first condition if a coincidence exists between:
a first candidate cryptographic footprint, wherein the first candidate cryptographic footprint is a cryptographic footprint of a first concatenation of the extracted optical reader data and of the first decoded data; and
the first reference cryptographic footprint;
verify a second condition if
a reference biometric data and the candidate biometric data of the individual match; and if the first condition and the second condition are verified,
  perform an enrollment of an authenticator.

16. A non-transitory computer program product comprising code instructions for the execution of the method according to claim 1 for strong authentication of an individual whereupon the program is executed on a computer.

\* \* \* \* \*